United States Patent
Narayana Moorthy et al.

(10) Patent No.: US 12,223,079 B2
(45) Date of Patent: Feb. 11, 2025

(54) PROVISIONING FEDERATED COMPUTATION ON DISTRIBUTED PRIVATE DATA

(71) Applicant: Intel Corporation, Santa Clara, CA (US)

(72) Inventors: Prakash Narayana Moorthy, Hillsboro, OR (US); Patrick Foley, Portland, OR (US); Micah Sheller, Hillsboro, OR (US); Clair Bowman, Boise, ID (US); G. Anthony Reina, Coronado, CA (US); Jason Martin, Beaverton, OR (US); Shih-Han Wang, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 223 days.

(21) Appl. No.: 17/483,543

(22) Filed: Sep. 23, 2021

(65) Prior Publication Data
US 2022/0012355 A1    Jan. 13, 2022

(51) Int. Cl.
G06F 21/00    (2013.01)
G06F 21/60    (2013.01)
G06F 21/62    (2013.01)

(52) U.S. Cl.
CPC ........ G06F 21/6227 (2013.01); G06F 21/602 (2013.01)

(58) Field of Classification Search
None
See application file for complete search history.

(56) References Cited

U.S. PATENT DOCUMENTS

| 2018/0212966 A1* | 7/2018 | Costa ................... H04L 63/10 |
| 2020/0106623 A1* | 4/2020 | Andreina ............. H04L 9/3263 |
| 2023/0048920 A1* | 2/2023 | Bhose ..................... G06N 3/08 |

FOREIGN PATENT DOCUMENTS

| DE | 112017006701 T5 * | 9/2019 | ......... G06F 16/1824 |
| JP | 2019109910 A * | 7/2019 | ......... G06F 12/0802 |
| WO | WO-2021050875 A1 * | 3/2021 | .......... G06F 11/1458 |

* cited by examiner

*Primary Examiner* — Andrew J Steinle
(74) *Attorney, Agent, or Firm* — JEFFERY WATSON HAMILTON & DESANCTIS LLP

(57) ABSTRACT

A method comprises receiving in a governor device, from a plurality of data owner devices, metadata for one or more datasets maintained by the plurality of data owner devices, registering the metadata for the one or more datasets with the governor device, in response to a request from an aggregator, providing at least a portion of the metadata for the one or more datasets to the aggregator, receiving, from the aggregator, a compute plan to be implemented by the plurality of data owner devices, distributing at least a portion of the compute plan to the plurality of data owner devices, in response to receiving, from the plurality of data owner devices, a verification report and a certification for an enclave, binding the enclave to a host device, and providing the compute plan to the plurality of data owner devices.

12 Claims, 8 Drawing Sheets

PROVISIONING FEDERATED COMPUTATION ON DISTRIBUTED PRIVATE DATA

BACKGROUND

In the field of federated computation involving distributed private data, a central institution (called aggregator) performs a compute on data that is distributed among a set of non-co-located data-owner institutions. The aggregator pushes the compute to the data-owner sites, where compute happens on the respective local data and whose results get pushed back to the aggregator. The aggregator may then aggregate the local results and repeat the compute again by providing the aggregated result as an extra input to the next compute. From a security and privacy perspective, it is of interest to use Trusted Execution Environments (TEEs) to carry out the local compute at the data-owner institutions and the aggregator, to facilitate preserving the integrity of the local computes on the different data owner sites, protecting the confidentiality of the aggregated results from the data owner sites, and protecting the confidentiality of local results from the aggregator before computing the aggregated result.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
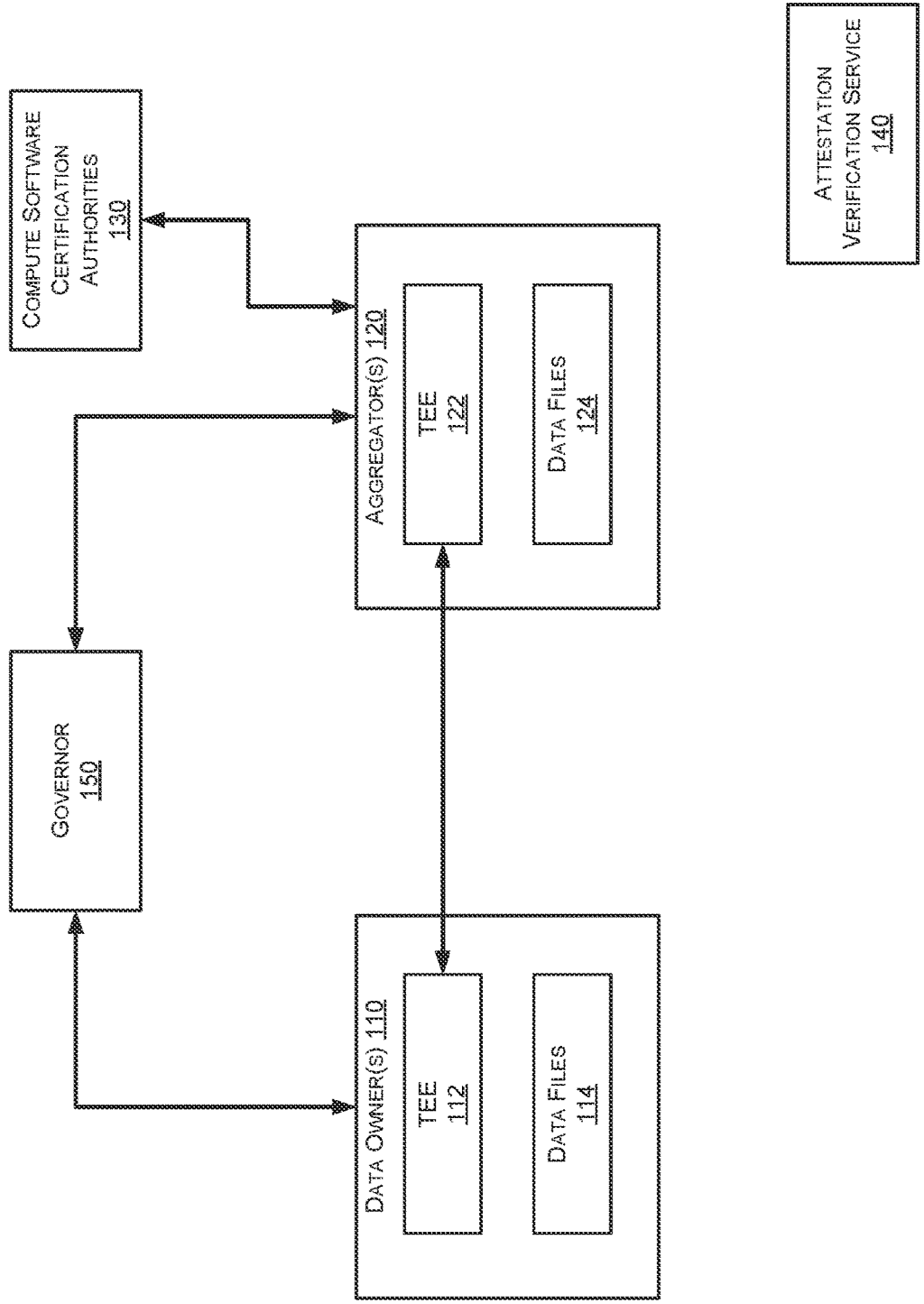
FIG. 1 is a simplified schematic diagram of a distributed computing environment in which federated computation on distributed private data may be implemented, in accordance with an embodiment.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C) Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As described above, in the field of federated computation involving distributed private data, a central institution (called aggregator) performs a compute on data that is distributed among a set of non-co-located data-owner institutions. The aggregator pushes the compute to the data-owner sites, where compute happens on the respective local data and whose results get pushed back to the aggregator. The aggregator may then aggregate the local results and repeat the compute again by providing the aggregated result as an extra input to the next compute. From a security and privacy perspective, it is of interest to use Trusted Execution Environments (TEEs) to carry out the local compute at the data-owner institutions and the aggregator, to facilitate preserving the integrity of the local computes on the different data owner sites, protecting the confidentiality of the aggregated results from the data owner sites, and protecting the confidentiality of local results from the aggregator (before computing the aggregated result).

To address these and other issues, described herein is an orchestration framework to carry out federated compute on distributed private data where the computes are protected by TEEs. In some examples the framework facilitates the following key requirements typically associated with standing-up a secure federated compute: (1) Maintaining consensus among data-owner and aggregator institutions about the compute plan including the data sets that will be used in the compute. (2) Preserving immutability of the compute plan once consensus is reached and delivering such compute plan directly to the TEEs that carry out the compute operations. (3) Standing up remote attested TEEs (at the participating data owner sites) that faithfully execute the expected compute plan. Further, the framework provides attestation assurance for TEEs that permits any data owner institution to verify that every other data owner institution indeed executes the expected compute plan. (4) Providing a mechanism for protecting the confidentiality of the "core compute software" from the admins that deploy the TEEs at the various data owner sites. This "core compute software" is typically treated as an IP belonging to the aggregator institution. (5) Providing a mechanism for the data owner administrators to poll the status of the overall execution yet keep the meta-data about the execution secure from entities that are not privy to such information.

In some examples, subject matter described herein comprises: 1) construction of a secure device that performs the dual role of infrastructure as well as application orchestrator, and 2) a sequence of carefully crafted distributed systems protocols employed among the data-owners, the aggregator and the device in order to achieve the five requirements stated above. In some examples the governor device may be designed and deployed as an Intel SGX-protected blockchain application. SGX for governor device guarantees privacy of confidential information handled by the governor device, while the blockchain guarantees robustness of the secure governor device—both confidentiality as well as robustness properties of the governor device are useful to deliver the 5 requirements described above.

FIG. 1 is a simplified schematic diagram of a distributed computing environment in which federated computation on distributed private data may be implemented, in accordance with an embodiment. Referring to FIG. 1, the environment 100 comprises one or more data owner devices 100, which may be embodied as a computing system comprising a trusted execution environment (TEE) 112 and one or more data files 114. Environment 100 further comprises one or more aggregators 120, which may also be embodied as a computing system comprising a trusted execution environment (TEE) 122 and one or more data files 124. The TEE 112 may be communicatively coupled to the TEE 122 via a direct, secure communication link. Environment 100 further comprises one or more compute software certification authorities 130 and an attestation verification service 140. In accordance with aspects described herein, environment 100 further comprises a governor device 150, which, as described above, may be embodied as an Intel SGX-protected blockchain application.

Figure 4:
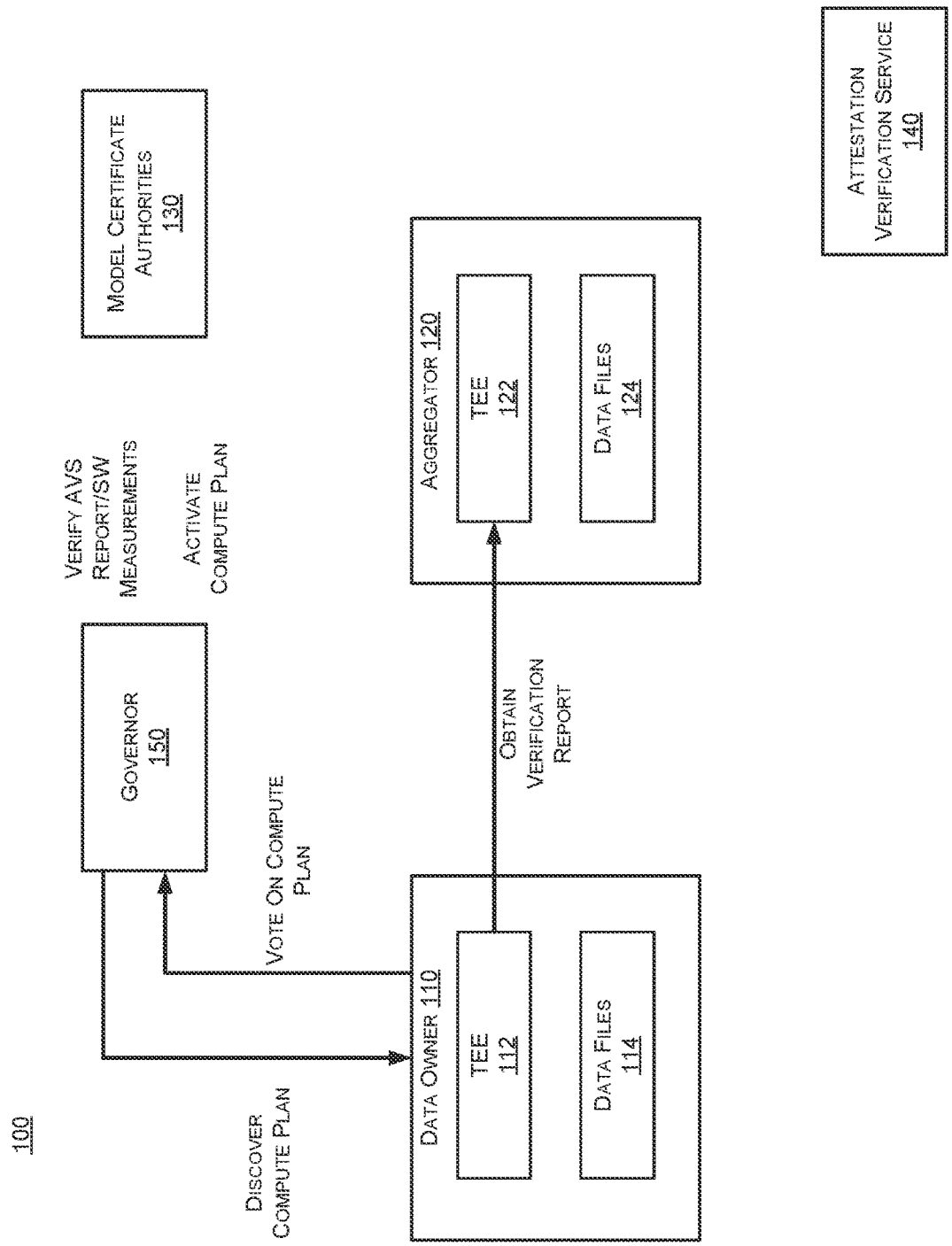
Figure 5:
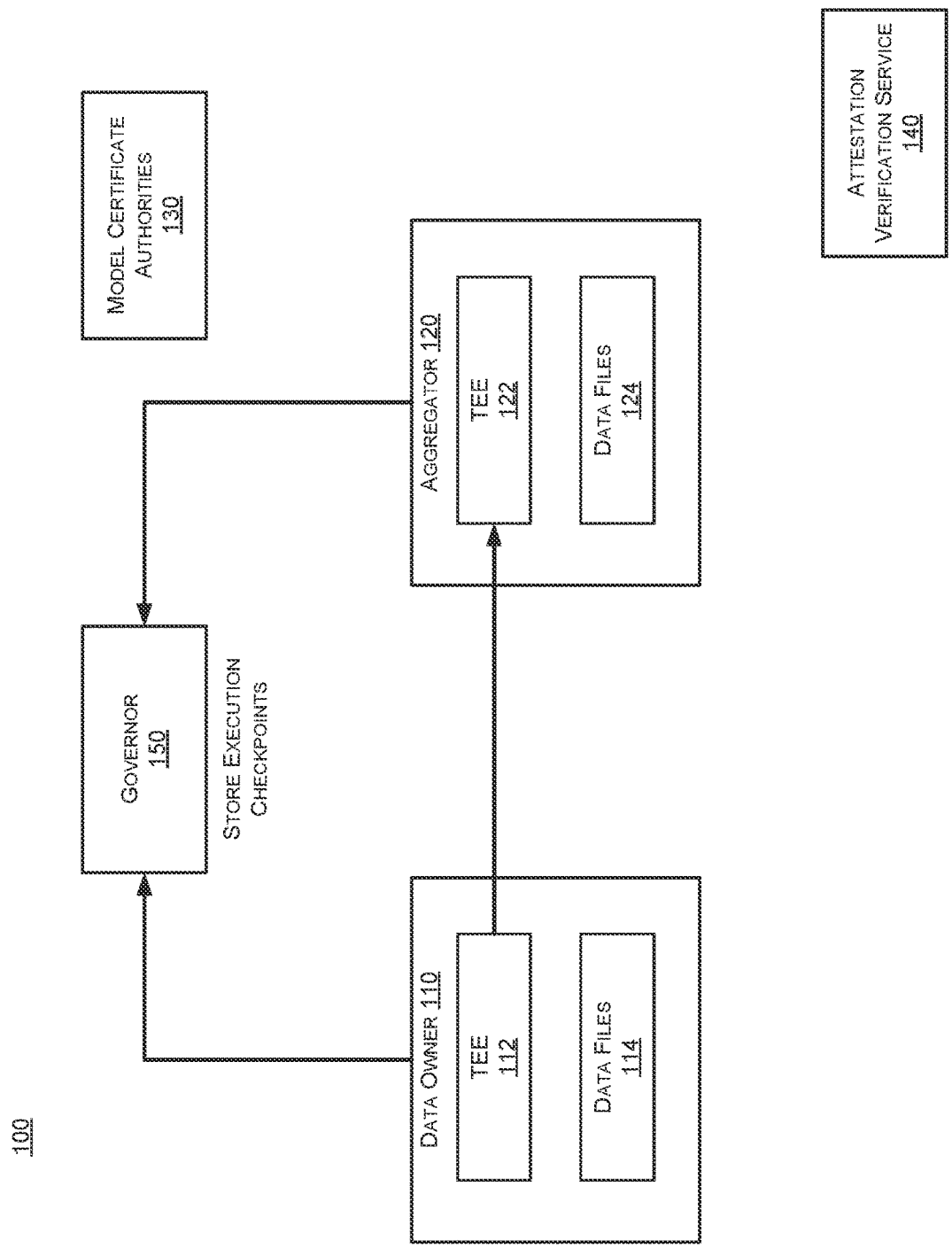
Figure 6:
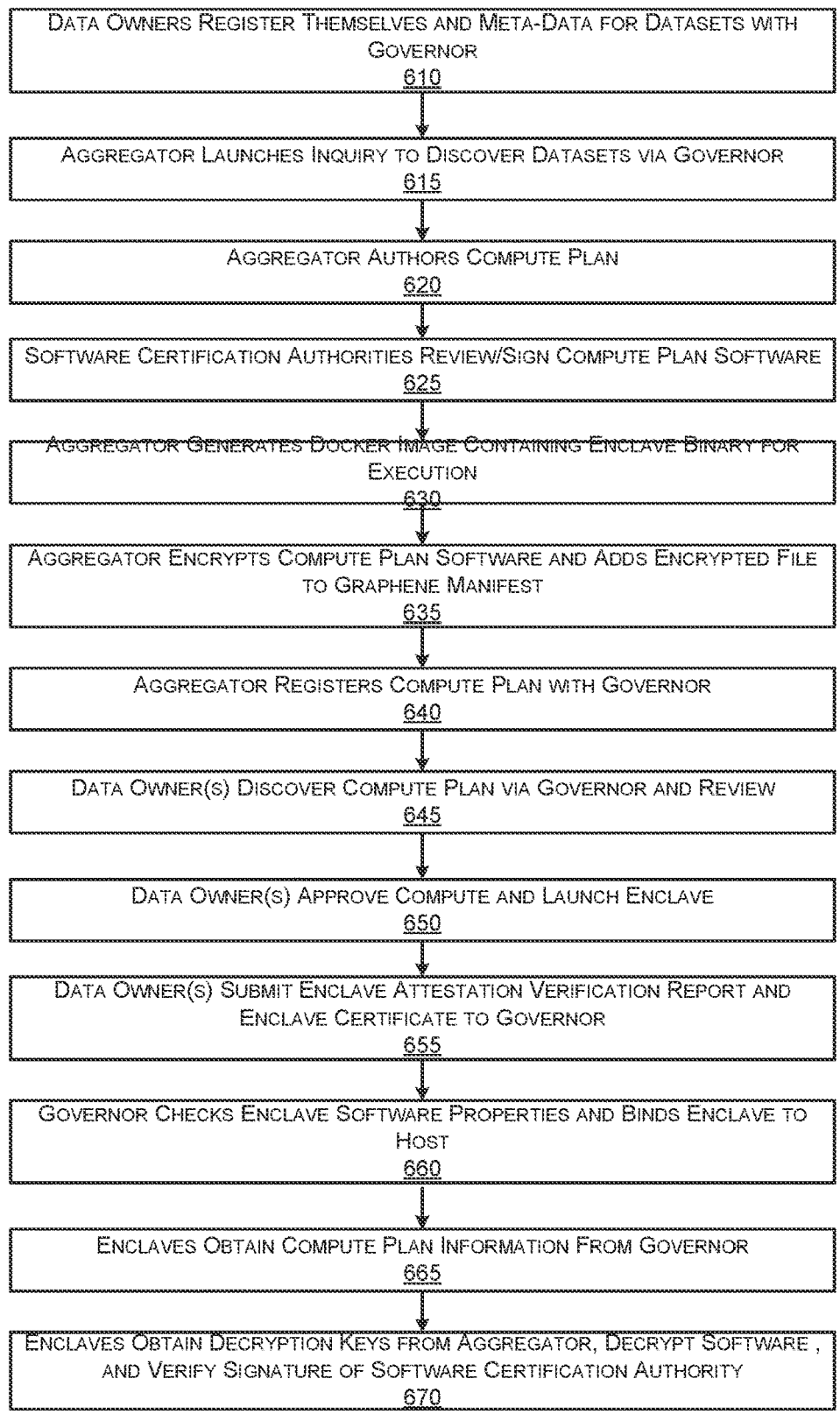
FIG. 6 is a simplified data flow diagram illustrating operations in a method to implement federated computation on distributed private data, in accordance with an embodiment.

Having described components of the environment 100, a description of distributed systems protocols employed among the data-owner(s) 110, aggregator, 120 and the governor device 150 will be provided with reference to the schematic drawings in FIGS. 2-5 and the flow chart depicted in FIG. 6.

Figure 2:
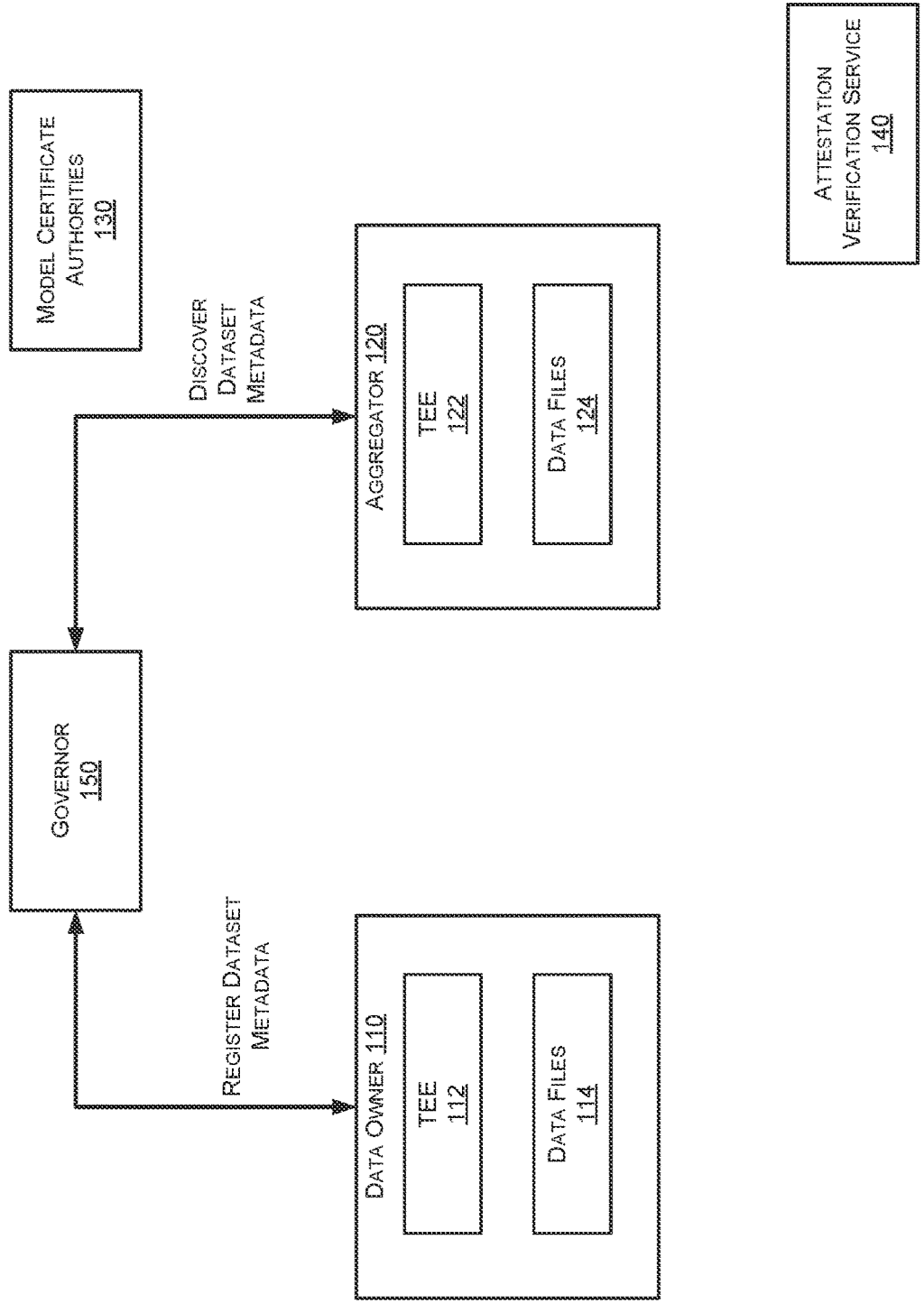
FIGS. 2-5 are simplified schematic diagrams of a distributed computing environment in which federated computation on distributed private data may be implemented, in accordance with an embodiment.

FIG. 2 depicts a first phase of an execution flow in a method to provision federated computation on distributed private data, according to embodiments. Referring to FIG. 2, in some examples an asset (e.g., dataset) registration and discovery phase may be facilitated by the governor device. At operation 610 one or more data owner devices 110 register meta-data info regarding datasets with the governor device 150. At operation 615 the aggregator 120 launches an inquiry to the governor device 150 to discover datasets, and at operation 620 the aggregator 120 authors the compute plan for federated computation. In some examples the compute plan may comprise the configuration of the execution including which data owner devices 110 are allowed to be in the federation, which software is allowed to be executed, and which data files 114, 124 are allowed to be used in the federated computation.

Figure 3:
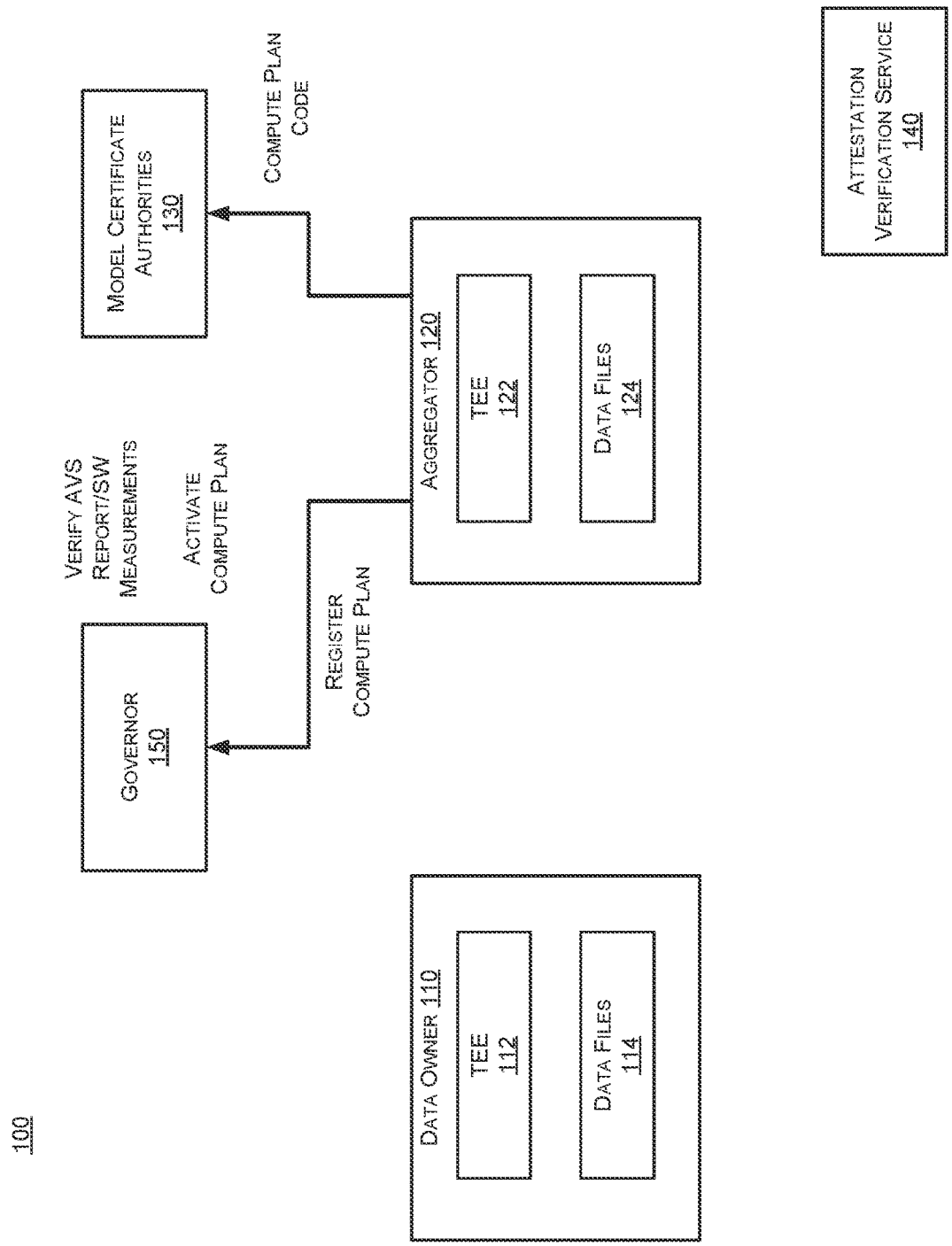

FIG. 3 depicts a second phase an execution flow in a method to provision federated computation on distributed private data, according to embodiments. Referring to FIG. 3, in some examples the second phase serves to address the competing requirements of 1) ensuring the compute software code meets the requirements of the data owner devices, (e.g., does not exfiltrate data or install malware), and 2) maintaining the confidentiality of any core intellectual property (IP) in the compute software code. Referring to FIG. 6, at operation 625, the aggregator's compute software code is reviewed and signed by one or more compute software certification authorities, which comprises a group of entities trusted by both the data owner devices 110 and the aggregator 120 capable of vetting the compute plan software. At operation 630, the aggregator 120 generates a docker image containing the graphene binary file that the data owner devices 110 are to instantiate. At operation 635 the aggregator encrypts the compute plan software code, which is added as a protected file in the graphene manifest. The identities of the certification authorities that signed the software certification are listed in the compute plan. The compute plan further contains a hash of the docker image as well as the expected MREnclave of the Graphene enclave. Once the aggregator packs everything, it registers the compute plan with the governor device 150.

FIG. 4 depicts a third phase an execution flow in a method to provision federated computation on distributed private data, according to embodiments. Referring to FIG. 4, in some examples, in the third phase the data owner device(s) 110 administrator initiates a request to discover (operation 645) the compute plan via the governor device 150. In some examples, the data owner device(s) 110 may obtain the docker image directly from the aggregator 120 and review the compute plan. In some examples the data owner device(s) administrator does not see the encrypted code. Instead, they rely on the signature obtained from the trusted compute software certification authority.

At operation 650 the data owner device(s) 110 administrator approve the plan and launches the enclave. In some examples the enclave generates a self-signed X509 certificate and attaches a certificate hash to the quote. The data owner device(s) 110 administrator gets the quote attested to verify the hardware properties of the enclave by the attestation verification service and, at operation 655, submits the verification report along with the enclave certificate to the governor device 150. At operation 660, the governor device 150 checks software properties of the enclave, (e.g., the MREnclave), then binds the enclave to the host. This binding property enables the aggregator 120 to identify the specific data owner device 110 from which a request comes when the enclave in the data owner device makes a task request to an enclave in the aggregator 120, and to verify the integrity of the enclave.

After the enclaves are registered, at operation 665 the enclaves obtain the compute plan information directly from the governor device and at operation 670 the enclaves verify the authenticity of the compute plan software. In some examples, to verify the software the enclaves, obtain compute software decryption keys from the compute plan author (e.g., the aggregator), decrypt the software inside the enclave, and verify the signature of the software (that the SW was unencrypted when signed by the certification authorities). If the signature check is successful, the enclave makes a remote procedure call (RPC) to the governor device 150 and informs the governor device 150 of the successful software verification. The governor device 150 activates the compute plan after all enclaves successfully verify compute software validity.

At this point the federated compute plan is provisioned, and execution of the plan can begin. By following the protocol described herein, all participant enclaves execute the expected compute plan. FIG. 5 depicts the execution phase an execution flow in a federated computation on distributed private data, according to embodiments. Referring to FIG. 5, in some examples, in the execution phase the data owner device(s) 110 execute the compute plan code and pass results to the aggregator 120. The governor device 150 stores execution checkpoints for the compute plan.

Figure 7:
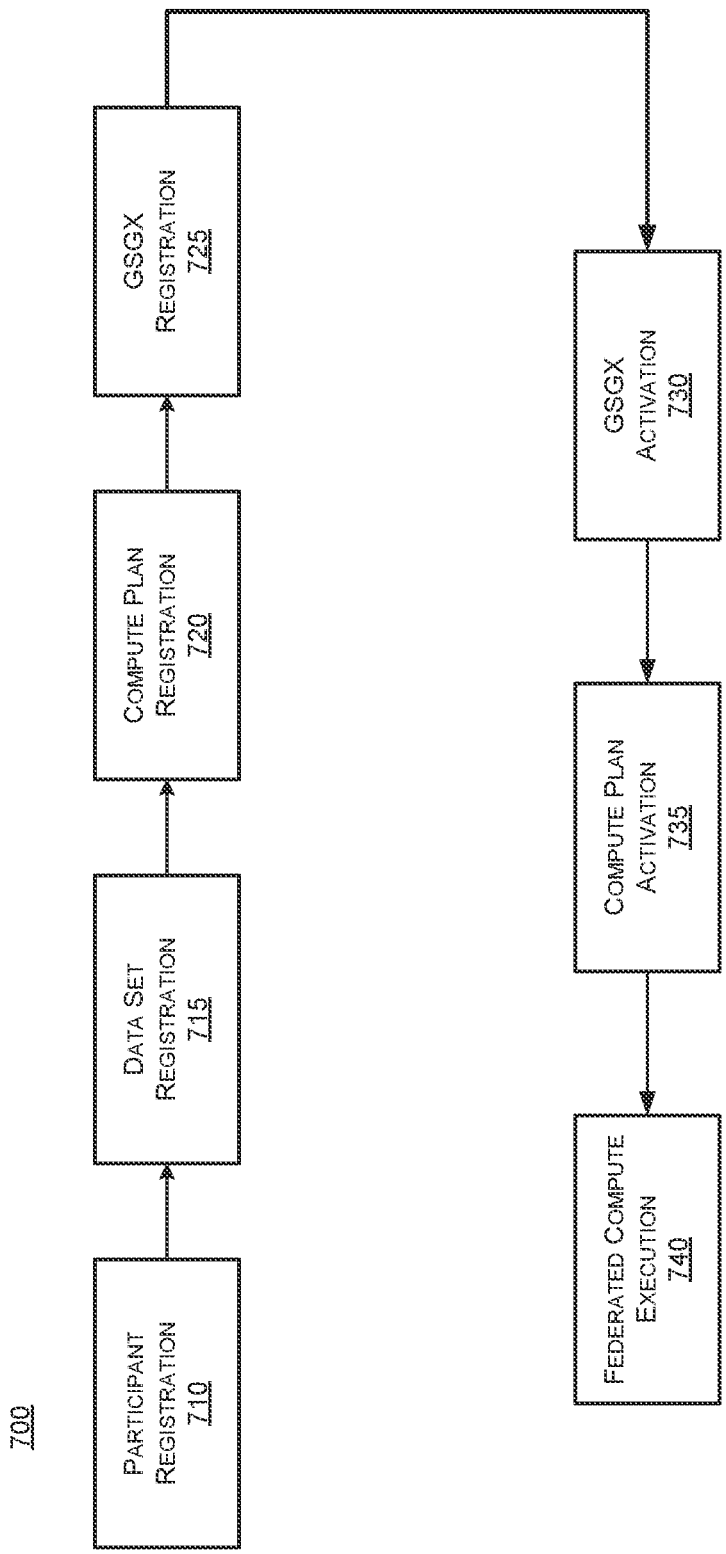
FIG. 7 is a schematic diagram of a state machine in a system to implement federated computation on distributed private data may be implemented, in accordance with an embodiment.

FIG. 7 is a schematic diagram of a state machine in a system to implement federated computation on distributed private data may be implemented, in accordance with an embodiment. Referring to FIG. 7, the first state 710 is a participant registration state in which the various entities involved in the federated computing register with the governor device 150. The second state 715 is a data set registration in which the data sets are registered with the governor device 150. The third state 720 is a compute plan registration state in which the compute plan is registered with the governor device 150. The fourth state 725 is a GSGX registration in which the enclaves are registered with the governor device 150. The fifth state is a GSGX activation state in which the enclaves are activated. The sixth state 735 is a compute plan activation state in which the compute plan is activated by the governor device 150. The seventh state 740 is a federated compute execution state in which the compute plan is executed by the various entities in the federation.

Figure 8:
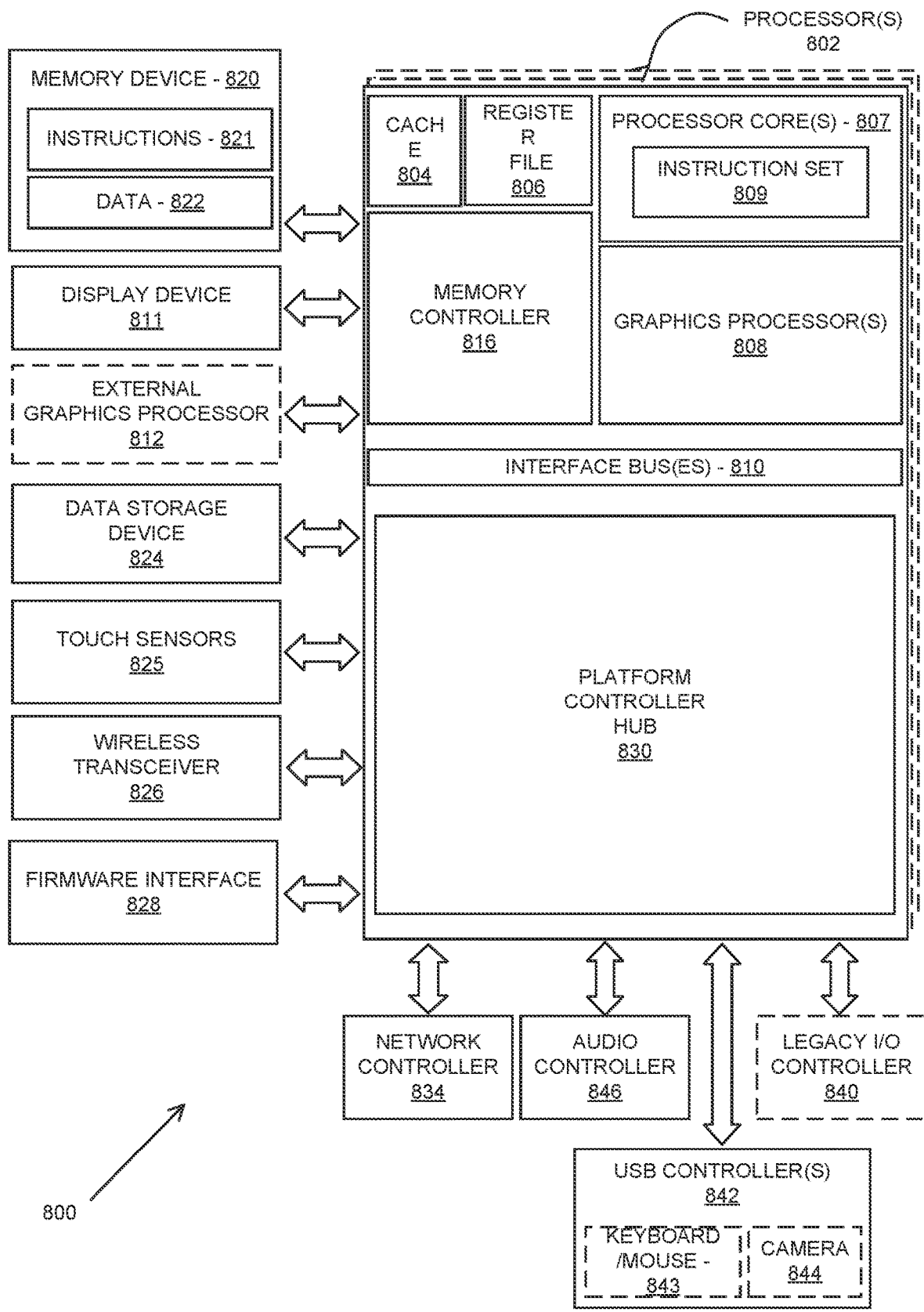
FIG. 8 is a block diagram illustrating a computing architecture which may be adapted to provide a method for secure PUF-based authentication using adversarial challenge selection according to an embodiment.

FIG. 8 is a block diagram illustrating a computing architecture which may be adapted to implement a secure address translation service using a permission table (e.g., HPT 135 or HPT 260) and based on a context of a requesting device in accordance with some examples. The embodiments may include a computing architecture supporting one or more of (i) verification of access permissions for a translated request prior to allowing a memory operation to proceed; (ii) prefetching of page permission entries of an HPT responsive to a translation request; and (iii) facilitating dynamic building of the HPT page permissions by system software as described above.

In various embodiments, the computing architecture 800 may comprise or be implemented as part of an electronic device. In some embodiments, the computing architecture 800 may be representative, for example, of a computer system that implements one or more components of the operating environments described above. In some embodiments, computing architecture 800 may be representative of one or more portions or components in support of a secure address translation service that implements one or more techniques described herein.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 includes one or more processors 802 and one or more graphics processors 808, and may be a single processor desktop system, a multiprocessor workstation system, or a server system having a large number of processors 802 or processor cores 807. In on embodiment, the system 800 is a processing platform incorporated within a system-on-a-chip (SoC or SOC) integrated circuit for use in mobile, handheld, or embedded devices.

An embodiment of system 800 can include, or be incorporated within, a server-based gaming platform, a game console, including a game and media console, a mobile gaming console, a handheld game console, or an online game console. In some embodiments system 800 is a mobile phone, smart phone, tablet computing device or mobile Internet device. Data processing system 800 can also include, couple with, or be integrated within a wearable device, such as a smart watch wearable device, smart eyewear device, augmented reality device, or virtual reality device. In some embodiments, data processing system 800 is a television or set top box device having one or more processors 802 and a graphical interface generated by one or more graphics processors 808.

In some embodiments, the one or more processors 802 each include one or more processor cores 807 to process instructions which, when executed, perform operations for system and user software. In some embodiments, each of the one or more processor cores 807 is configured to process a specific instruction set 814. In some embodiments, instruction set 809 may facilitate Complex Instruction Set Computing (CISC), Reduced Instruction Set Computing (RISC), or computing via a Very Long Instruction Word (VLIW). Multiple processor cores 807 may each process a different instruction set 809, which may include instructions to facilitate the emulation of other instruction sets. Processor core 807 may also include other processing devices, such a Digital Signal Processor (DSP).

In some embodiments, the processor 802 includes cache memory 804. Depending on the architecture, the processor 802 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 is additionally included in processor 802 which may include different types of registers for storing different types of data (e.g., integer registers, floating point registers, status registers, and an instruction pointer register). Some registers may be general-purpose registers, while other registers may be specific to the design of the processor 802.

In some embodiments, one or more processor(s) 802 are coupled with one or more interface bus(es) 810 to transmit communication signals such as address, data, or control signals between processor 802 and other components in the system. The interface bus 810, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 802 include an integrated memory controller 816 and a platform controller hub 830. The memory controller 816 facilitates communication between a memory device and other components of the system 800, while the platform controller hub (PCH) 830 provides connections to I/O devices via a local I/O bus.

Memory device 820 can be a dynamic random-access memory (DRAM) device, a static random-access memory (SRAM) device, flash memory device, phase-change memory device, or some other memory device having suitable performance to serve as process memory. In one embodiment the memory device 820 can operate as system memory for the system 800, to store data 822 and instructions 821 for use when the one or more processors 802 execute an application or process. Memory controller hub 816 also couples with an optional external graphics processor 812, which may communicate with the one or more graphics processors 808 in processors 802 to perform graphics and media operations. In some embodiments a display device 811 can connect to the processor(s) 802. The display device 811 can be one or more of an internal display device, as in a mobile electronic device or a laptop device or an external display device attached via a display interface (e.g., DisplayPort, etc.). In one embodiment the display device 811 can be a head mounted display (HMD) such as a stereoscopic display device for use in virtual reality (VR) applications or augmented reality (AR) applications.

In some embodiments the platform controller hub 830 enables peripherals to connect to memory device 820 and processor 802 via a high-speed I/O bus. The I/O peripherals include, but are not limited to, an audio controller 846, a network controller 834, a firmware interface 828, a wireless transceiver 826, touch sensors 825, a data storage device 824 (e.g., hard disk drive, flash memory, etc.). The data storage device 824 can connect via a storage interface (e.g., SATA) or via a peripheral bus, such as a Peripheral Component Interconnect bus (e.g., PCI, PCI Express). The touch sensors 825 can include touch screen sensors, pressure sensors, or fingerprint sensors. The wireless transceiver 826 can be a WI-FI transceiver, a BLUETOOTH transceiver, or a mobile network transceiver such as a 3G, 4G, Long Term Evolution (LTE), or 5G transceiver. The firmware interface 828 enables communication with system firmware, and can be, for example, a unified extensible firmware interface (UEFI). The network controller 834 can enable a network connection to a wired network. In some embodiments, a high-performance network controller (not shown) couples with the interface bus 810. The audio controller 846, in one embodiment, is a multi-channel high definition audio controller. In one embodiment the system 800 includes an optional legacy I/O controller 840 for coupling legacy (e.g., Personal System 2 (PS/2)) devices to the system. The platform controller hub 830 can also connect to one or more Universal Serial Bus (USB) controllers 842 connect input devices, such as keyboard and mouse 843 combinations, a camera 844, or other USB input devices.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Example 1 is method comprising receiving in a governor device, from a plurality of data owner devices, metadata for one or more datasets maintained by the plurality of data owner devices, registering the metadata for the one or more datasets with the governor device, in response to a request from an aggregator, providing at least a portion of the metadata for the one or more datasets to the aggregator; receiving, from the aggregator, a compute plan to be implemented by the plurality of data owner devices; distributing at least a portion of the compute plan to the plurality of data owner devices; in response to receiving, from the plurality of data owner devices, a verification report and a certification for an enclave, binding the enclave to a host device; and providing the compute plan to the plurality of data owner devices.

Example 2 includes the subject matter of Example 1, wherein the compute plan specifies a set of data owner devices from the plurality of data owner devices that are to execute the compute plan; one or more pieces of software to be executed in the compute plan; and one or more data files to be used in the compute plan.

Example 3 includes the subject matter of Examples 1-2, wherein the compute plan comprises an image containing a binary file for execution; a hash of the image; a certification from a certification authority; and an enclave identifier.

Example 4 includes the subject matter of Examples 1-3, wherein the compute plan comprises an encrypted file comprising the one or more data files to be used in the compute plan.

Example 5 includes the subject matter of Examples 1-4, wherein the plurality of data owner devices approve the compute plan; and launch an enclave to execute the compute plan.

Example 6 includes the subject matter of Examples 1-5, wherein the enclave generates a certificate; and returns the certificate to a data owner device in the plurality of data owner devices.

Example 7 includes the subject matter of Examples 1-6, further comprising monitoring one or more checkpoints in an execution phase of the compute plan.

Example 8 is an apparatus, comprising a processor; and a computer readable memory comprising instructions which, when executed by the processor, cause the processor to receive in a governor device, from a plurality of data owner devices, metadata for one or more datasets maintained by the plurality of data owner devices; register the one or more datasets with the governor device; in response to a request from an aggregator, provide at least a portion of the metadata for the one or more datasets to the aggregator; receive, from the aggregator, a compute plan to be implemented by the plurality of data owner devices; distribute at least a portion of the compute plan to the plurality of data owner devices; in response to a receipt, from the plurality of data owner devices, of a verification report and a certification for an enclave, bind the enclave to a host device; and provide the compute plan to the plurality of data owner devices.

Example 9 includes the subject matter of Example 8, wherein the compute plan specifies a set of data owner devices from the plurality of data owner devices that are to execute the compute plan; one or more pieces of software to be executed in the compute plan; and one or more data files to be used in the compute plan.

Example 10 includes the subject matter of Examples 8-9 wherein the compute plan comprises an image containing a binary file for execution; a hash of the image; a certification from a certification authority; and an enclave identifier.

Example 11 includes the subject matter of Examples 8-10, wherein the compute plan comprise an encrypted file comprising the one or more data files to be used in the compute plan.

Example 12 includes the subject matter of Examples 8-11, wherein the plurality of data owner devices approve the compute plan; and launch an enclave to execute the compute plan.

Example 13 includes the subject matter of Examples 8-12, wherein the enclave generates a certificate; and returns the certificate to a data owner device in the plurality of data owner devices.

Example 14 includes the subject matter of Examples 8-13, further comprising monitoring one or more checkpoints in an execution phase of the compute plan.

Example 15 is one or more computer-readable storage media comprising instructions stored thereon that, in response to being executed, cause a computing device to receive in a governor device, from a plurality of data owner devices, metadata for one or more datasets maintained by the plurality of data owner devices; register the one or more datasets with the governor device; in response to a request from an aggregator, provide at least a portion of the metadata for the one or more datasets to the aggregator; receive, from the aggregator, a compute plan to be implemented by the plurality of data owner devices; distribute at least a portion of the compute plan to the plurality of data owner devices; in response to a receipt, from the plurality of data owner devices, of a verification report and a certification for an enclave, bind the enclave to a host device; and provide the compute plan to the plurality of data owner devices.

Example 16 includes the subject matter of Example 15, wherein the compute plan specifies a set of data owner devices from the plurality of data owner devices that are to execute the compute plan; one or more pieces of software to be executed in the compute plan; and one or more data files to be used in the compute plan.

Example 17 includes the subject matter of Examples 15-16, wherein the compute plan comprises an image containing a binary file for execution; a hash of the image; a certification from a certification authority; and an enclave identifier.

Example 18 includes the subject matter of Examples 15-17, wherein the compute plan comprise an encrypted file comprising the one or more data files to be used in the compute plan.

Example 19 includes the subject matter of Examples 15-18, wherein the plurality of data owner devices approve the compute plan; and launch an enclave to execute the compute plan.

Example 20 includes the subject matter of Examples 15-19, wherein the enclave generates a certificate; and returns the certificate to a data owner device in the plurality of data owner devices.

Example 21 includes the subject matter of Examples 15-20, further comprising monitoring one or more checkpoints in an execution phase of the compute plan.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments require more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. A method comprising:
receiving, by a processor of a computing device, metadata for one or more datasets maintained by data-owner devices;
in response to receiving a request from an aggregator device, providing at least a portion of the metadata for the one or more datasets to the aggregator device;
receiving, from the aggregator device, a compute plan to be implemented by the data-owner devices;
monitoring one or more checkpoints in an execution phase of the compute plan; and
distributing at least a portion of the compute plan to the data-owner devices, wherein the compute plan is executed by one or more of the data-owner devices as specified by the compute plan.

2. The method of claim 1, wherein in response to receiving, from the data-owner devices, one or more of a verification report or a certification for an enclave, wherein the enclave is bound to a host device, wherein the compute plan specifies one or more of:
one or more pieces of software to be executed in the compute plan; or
one or more data files to be used in the compute plan.

3. The method of claim 2, wherein the compute plan comprises:
an image containing a binary file for execution;
a hash of the image;
a certification from a certification authority;
an enclave identifier; and
an encrypted file comprising the one or more data files to be used in the compute plan.

4. The method of claim 1, further comprising:
approving the compute plan; and
launching an enclave to execute the compute plan, wherein the enclave generates the certificate and returns the certificate to a data-owner device.

5. An apparatus comprising:
processor circuitry coupled to a memory, the processor circuitry to:
receive metadata for one or more datasets maintained by data-owner devices;
in response to receiving a request from an aggregator device, provide at least a portion of the metadata for the one or more datasets to the aggregator device;
receive, from the aggregator device, a compute plan to be implemented by the data-owner devices;
monitor one or more checkpoints in an execution phase of the compute plan; and
distribute at least a portion of the compute plan to the data-owner devices, wherein the compute plan is executed by one or more of the data-owner devices as specified by the compute plan.

6. The apparatus of claim 5, wherein in response to receiving, from the data-owner devices, one or more of a verification report or a certification for an enclave, wherein the enclave is bound to a host device, wherein the compute plan specifies one or more of:
one or more pieces of software to be executed in the compute plan; or
one or more data files to be used in the compute plan.

7. The apparatus of claim 6, wherein the compute plan comprises:
an image containing a binary file for execution;
a hash of the image;
a certification from a certification authority;
an enclave identifier; and
an encrypted file comprising the one or more data files to be used in the compute plan.

8. The apparatus of claim 5, wherein the processor circuitry is further to:
approve the compute plan; and
launch an enclave to execute the compute plan, wherein the enclave generates the certificate and returns the certificate to a data-owner device.

9. At least one non-transitory computer-readable medium having stored thereon instructions which, when executed, cause a computing device to perform operations comprising:
receiving metadata for one or more datasets maintained by data-owner devices;
in response to receiving a request from an aggregator device, providing at least a portion of the metadata for the one or more datasets to the aggregator device;
receiving, from the aggregator device, a compute plan to be implemented by the data-owner devices;
monitor one or more checkpoints in an execution phase of the compute plan; and
distributing at least a portion of the compute plan to the data-owner devices, wherein the compute plan is executed by one or more of the data-owner devices as specified by the compute plan.

10. The non-transitory computer-readable medium of claim 9, wherein in response to receiving, from the data-owner devices, one or more of a verification report or a certification for an enclave, wherein the enclave is bound to a host device, wherein the compute plan specifies one or more of:
  one or more pieces of software to be executed in the compute plan; or
  one or more data files to be used in the compute plan.

11. The non-transitory computer-readable medium of claim 10, wherein the compute plan comprises:
  an image containing a binary file for execution;
  a hash of the image;
  a certification from a certification authority;
  an enclave identifier; and
  an encrypted file comprising the one or more data files to be used in the compute plan.

12. The non-transitory computer-readable medium of claim 9, wherein the operations further comprise:
  approve the compute plan; and
  launch an enclave to execute the compute plan, wherein the enclave generates the certificate and returns the certificate to a data-owner device.

* * * * *